(12) United States Patent
Kwong et al.

(10) Patent No.: US 7,108,413 B2
(45) Date of Patent: Sep. 19, 2006

(54) SAMPLING FOR COLOR CONTROL FEEDBACK USING AN OPTICAL CABLE

(75) Inventors: Yin Leong Kwong, Penang (MY); Choon Guan Ko, Penang (MY); Chun Hean Cheah, Penang (MY)

(73) Assignee: Avago Technologies ECBU IP (Singapore) Pte. Ltd., (SG)

( * ) Notice: Subject to any disclaimer, the term of this patent is extended or adjusted under 35 U.S.C. 154(b) by 189 days.

(21) Appl. No.: 10/798,130

(22) Filed: Mar. 11, 2004

(65) Prior Publication Data

US 2005/0200315 A1    Sep. 15, 2005

(51) Int. Cl.
*F21V 9/00* (2006.01)
*F21V 8/00* (2006.01)
*G05D 25/02* (2006.01)
*G01J 1/04* (2006.01)
*G01J 1/32* (2006.01)

(52) U.S. Cl. .................. 362/583; 362/231; 362/295; 362/552; 362/555; 250/205; 250/227.11

(58) Field of Classification Search ................ 362/552, 362/555, 583, 295, 231; 250/228
See application file for complete search history.

(56) References Cited

U.S. PATENT DOCUMENTS

| | | | | |
|---|---|---|---|---|
| 3,924,121 A | * | 12/1975 | Barbieri | 250/226 |
| 4,681,454 A | * | 7/1987 | Breemer | 356/402 |
| 4,810,937 A | * | 3/1989 | Havel | 315/152 |
| 5,159,185 A | * | 10/1992 | Lehr | 250/205 |
| 5,831,686 A | * | 11/1998 | Beretta | 250/205 |
| 6,123,437 A | | 9/2000 | Holmes | |
| 6,127,783 A | * | 10/2000 | Pashley et al. | 315/149 |
| 6,344,641 B1 | * | 2/2002 | Blalock et al. | 250/205 |
| 6,393,431 B1 | | 5/2002 | Salvati et al. | |
| 6,566,689 B1 | * | 5/2003 | Hoelen et al. | 250/227.11 |
| 6,625,558 B1 | | 9/2003 | Van Ausdall et al. | |
| 6,674,060 B1 | * | 1/2004 | Antila | 250/205 |
| 6,726,341 B1 | * | 4/2004 | Pashley et al. | 362/92 |
| 6,753,661 B1 | * | 6/2004 | Muthu et al. | 315/307 |
| 6,969,843 B1 | * | 11/2005 | Beach et al. | 250/228 |
| 2003/0034985 A1 | * | 2/2003 | Needham et al. | 345/589 |

* cited by examiner

*Primary Examiner*—Alan Cariaso

(57) ABSTRACT

Light is mixed within a mixing cavity. Light is transported from the mixing cavity, through an optical cable, to a color sensor. The transported light is sampled by the color sensor. Light color within the mixing cavity is controlled based on information from the transported light sampled by the color sensor.

20 Claims, 3 Drawing Sheets

SAMPLING FOR COLOR CONTROL FEEDBACK USING AN OPTICAL CABLE

BACKGROUND

The present invention relates to light mixing and pertains particularly to sampling for color control feedback using an optical cable.

Light mixing is used to produce a desired color from base colors. For example red, green and blue (RGB) light emitting diodes (LEDs) can be used in a mixing cavity to produce a desired resultant color. A light mixing cavity is used to ensure thorough mixing of the RGB LEDs so that an eye will perceive the desired resultant color. If the mixing is incomplete, an eye may see different color spots on a surface of the mixing cavity.

There are many uses for a mixing cavity. For example, a mixing cavity with a suitable light guide panel can be used as a backlight for a liquid crystal display (LCD). In this case, thorough mixing of colors is very important to ensure color and brightness uniformity across the LCD. Typically, backlighting for an LCD requires one color point across all the display area. For example, the color point is a white D65 color point. A diffusant can be used across the surface of the mixing cavity to improve uniformity of color and brightness.

A mixing cavity can also be used, for example, to provide room lighting. In this case color mixing within a mixing cavity is not as crucial as in cases like providing backlighting for an LCD. A lens can be added to the surface of the mixing cavity to gather light and illuminate the room. In this case, it is usually not considered a defect if directly looking at the LED light source results in seeing red, green and/or blue spots so long as reflected light from all surfaces is able to diffuse the three color sources into one resultant color.

When using mixing cavities that require accurate mixing of colors, it may be desirable to obtain feedback about a produced color. This can be done, for example, using a light sensor placed within the light cavity. However, the brightness may cause saturation of the light sensor. Alternatively, a light sensor can be placed outside the light cavity; however, in this case, ambient light can sometimes impact the quality of the obtained color feedback.

SUMMARY OF THE INVENTION

In accordance with an embodiment of the present invention, light is mixed within a mixing cavity. Light is transported from the mixing cavity, through an optical cable, to a color sensor. The transported light is sampled by the color sensor. Light color and brightness within the mixing cavity is controlled based on information from the transported light sampled by the color sensor.

DESCRIPTION OF THE EMBODIMENT

Figure 1:
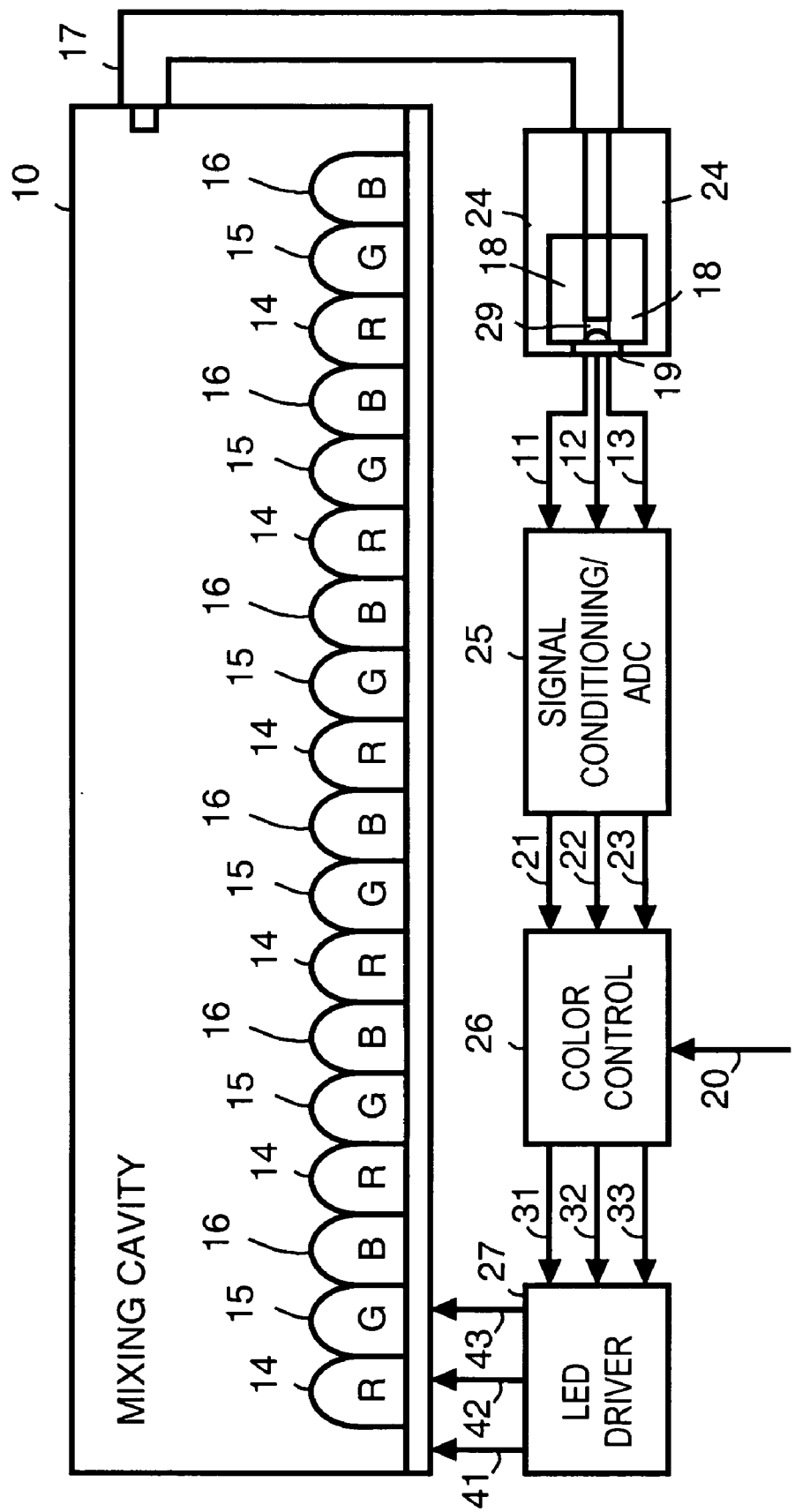
FIG. 1 is simplified block diagram of a light cavity for which an optical cable is used to transport light to a feedback sensor in accordance with an embodiment of the present invention.

FIG. 1 shows a mixing cavity 10 used for mixing colors. Within mixing cavity 10, red light emitting diodes (LEDs) 14 provide red light, green light emitting diodes (LEDs) 15 provide green light and blue light emitting diodes (LEDs) 16 provide blue light. LED driver(s) 27 control the brightness of red LEDs 14 through the use of a red color control signal 41. LED driver(s) 27 control the brightness of green LEDs 15 through the use of a green color control signal 42. LED driver(s) 27 control the brightness of blue LEDs 16 through the use of a blue color control signal 43.

Color control block 26 provides to LED driver(s) 27 a red pulse width modulated (PWM) signal 31, a green PWM signal 32 and a blue PWM signal 33. For example, red PWM signal 31, green PWM signal 32 and blue PWM signal 33 each provide eight-bit digital values to LED driver(s) 27. LED driver(s) 27 uses red PWM signal 31, green PWM signal 32 and blue PWM signal 33 to respectively generate red color control signal 41, green color control signal 42 and blue color control signal 43. The use of eight-bit values is exemplary as the number of bits used will vary depending upon the application.

Color control 26 stores a requested red value ($R_{REQ}$), a requested green value ($G_{REQ}$) and a requested blue value ($B_{REQ}$) received via a port 20. The format of the requested values can be, for example, plainly RGB values, CIE Y,x,y, CIE Y,u,V, or CIE XYZ. Color control block 26 generates red PWM signal 31 based on a red control value ($R_{CON}$) stored within control block 26. Color control block 26 generates green PWM signal 32 based on a green control value ($G_{CON}$) stored within control block 26. Color control block 26 generates blue PWM signal 33 based on a blue control value ($B_{CON}$) stored within control block 26.

Color feedback of light within mixing cavity 10 is obtained by an optical cable 17. For example, optical cable 17 is a fiber optic cable. Alternatively, optical cable 17 is any type of light guide or light panel shielded or unshielded from external ambient light. Optical cable 17 can be formed using plastic, glass or another type of optically transmissive material, and can be of any shape or size that allows light to travel and reach a color sensor 19 with sufficient brightness to allow adequate color detection. Optical cable 17 may be placed in any location within mixing cavity 10. It is preferred that optical cable 17 is attached at a location within mixing cavity 10 where light is mixed thoroughly from all LEDs in mixing cavity 10 to provide accurate feedback. For example, a small hole can be made at a selected location of mixing cavity 10. Optical cable 17 is placed inside the hole and bonded with an optically clear and transmissive epoxy.

Optical cable 17 is shielded at locations outside mixing cavity 10 to eliminate ambient light interference. This provides very good color control and resolution when transporting light within optical cable 17.

Light within fiber cable 17 is provided to color sensor 19 through an optional neutral density filter 29. Neutral density filter 29 may be eliminated or located elsewhere in the lighting system. Alternatively, instead of neutral density filter 29, a single or multiple color filter can be used. For example, a red filter can be used if, without a filter, only a red channel color of color sensor 19 is saturated. Neutral density filtering is used, for example, when red, green and blue channels of color sensor 19 are all saturated.

For example, optical cable 17 is positioned with respect to, and/or attached or bonded to color sensor 19 using a transparent epoxy 18. Opaque epoxy 24, surrounding color sensor 19 and the joint between optical cable 17 and color sensor 19, eliminates ambient light interference at the junction of optical cable 17 and color sensor 19. While one optical cable 17 is shown, it will be understood by persons of ordinary skill in the art that in some applications, additional feedback resolution can be obtained by locating additional optical cables at locations within mixing cavity 10 and using these to provide additional color feedback, using additional light sensors.

Color sensor 19 generates three separate output voltages (Vout): a Vout (R) signal 11, a Vout (G) signal 12 and a Vout (B) signal 13. Vout (R) signal 11 is an analog signal that indicates the proportional red component detected from within mixing cavity 10. For example, Vout (R) signal 11 is a DC voltage between 0 and 3 volts. Vout (G) signal 12 is an analog signal that indicates the proportional green component detected from within mixing cavity 10. For example, Vout (G) signal 12 is a DC voltage between 0 and 3 volts. Vout (B) signal 13 is an analog signal that indicates the proportional blue component detected from within mixing cavity 10. For example, Vout (B) signal 13 is a DC voltage between 0 and 3 volts. All these implementation details are exemplary as other colors and other voltage values and/or other signal types can be used, as will be understood by persons of ordinary skill in the art.

A signal conditioning analog-to-digital conversion (ADC) block 25 receives Vout (R) signal 11, Vout (G) signal 12 and Vout (B) signal 13. Each of Vout (R) signal 11, Vout (G) signal 12 and Vout (B) signal 13 is filtered with a low pass filter that removes high frequency noise and a provides an averaged amplitude for each of Vout (R) signal 11, Vout (G) signal 12 and Vout (B) signal 13. The resulting signals are amplified and then analog-to-digital conversion is performed.

Signal conditioning analog-to-digital conversion (ADC) block 25 produces a measured red intensity ($R_{MEAS}$) value 21, a measured green intensity ($G_{MEAS}$) value 22 and a measured blue intensity ($B_{MEAS}$) value 23. For example, measured red intensity ($R_{MEAS}$) value 21 is an eight bits wide value that is a digital representation of the averaged amplitude of Vout(R) signal 11. For greater resolution, measured red intensity ($R_{MEAS}$) value 21 can be more than eight bits wide. For example, $R_{MEAS}$ value 21 is transmitted serially to color control block 26. For example, measured green intensity ($G_{MEAS}$) value 22 is an eight bit value that is a digital representation of the averaged amplitude of Vout(G) signal 12. For greater resolution, measured green intensity ($G_{MEAS}$) value 22 can be more than eight bits wide. For example, $G_{MEAS}$ value 22 is transmitted serially to color control block 26. For example, measured blue intensity ($B_{MEAS}$) value 23 is an eight bit value that is a digital representation of the averaged amplitude of Vout(B) signal 13. For greater resolution, measured blue intensity ($B_{MEAS}$) value 23 can be more than eight bits wide. For example, $B_{MEAS}$ is transmitted serially to color control block 26.

Serial transmission of measured red intensity ($R_{MEAS}$) value 21, measured green intensity ($G_{MEAS}$) value 22 and a measured blue intensity ($B_{MEAS}$) value 23 is performed, for example, using a separate line for each of the intensity values, or alternatively, can be performed using a single serial line with a 3 line to one line multiplexer or other three to one selector. Alternatively, parallel transmission can be used can be used.

In order to minimize noise interference, color sensor 19 is physically located close to signal conditioning ADC block 25.

Figure 2:
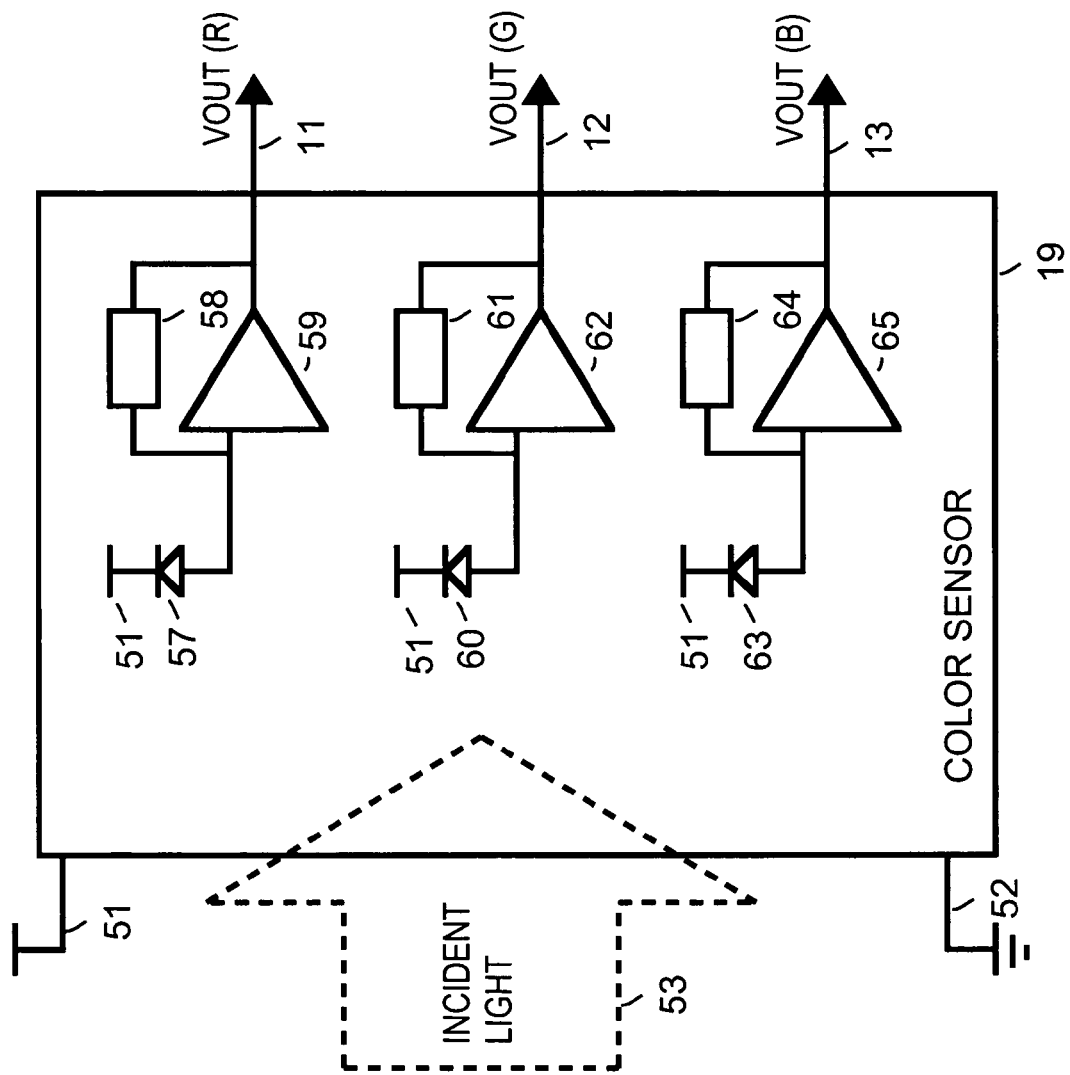
FIG. 2 is simplified block diagram of a color sensor used as a feedback sensor in accordance with an embodiment of the present invention.

FIG. 2 is simplified block diagram of color sensor 19. Color sensor 19 receives a power input signal 51 and a ground input signal 52. For example power input 51 is at 5.0 volts. The gain and resolution of color sensor 19 are application based and color sensor 19 is designed with sufficiently gain and resolution to provide the desired accuracy in feedback.

Color sensor 19 generates output voltages Vout (R) signal 11, Vout (G) signal 12 and Vout (B) signal 13 based on incident light 53 from optical cable 17. Vout (R) signal 11 is generated by a photo sensor 57, an amplifier 59 and a feedback resistor 58, which are all located within color sensor 19. Photo sensor 57 includes an integrated color filter in red. Photo sensor 57 is connected to power input signal 51.

Vout (G) signal 12 is generated by a photo sensor 60, an amplifier 62 and a feedback resistor 61, which are all located within color sensor 19. Photo sensor 60 includes an integrated color filter in green. Photo sensor 60 is connected to power input signal 51.

Vout (B) signal 13 is generated by a photo sensor 63, an amplifier 65 and a feedback resistor 64, which are all located within color sensor 19. Photo sensor 63 includes an integrated color filter in blue. Photo sensor 63 is connected to power input signal 51.

The gain and resolution of color sensor 19 are application based. Color sensor 19 is designed with sufficiently gain and resolution to provide the desired accuracy in feedback. Saturation of color sensor 19 can be avoided by providing a neutral density filter between color sensor 19 and optical cable 17, or by providing neutral density filter within mixing cavity 10 to filter light received by optical cable 17. Saturation can also be resolved by selecting optical cable 17 to include a reduced diameter or by reducing the number of optical fibers used to provide light to color sensor 19. Alternatively, or in addition, optical cable 17 can be attached to a location within mixing cavity 10 where light is completely mixed but light intensity is sufficient low to prevent saturation of color sensor 19.

FIG. 2 presents only one example of implementation of color sensor 19. Alternative implementations can consist, for example, of discreet photosensors and filters, or color sensors integrated on CMOS, etc.

Figure 3:
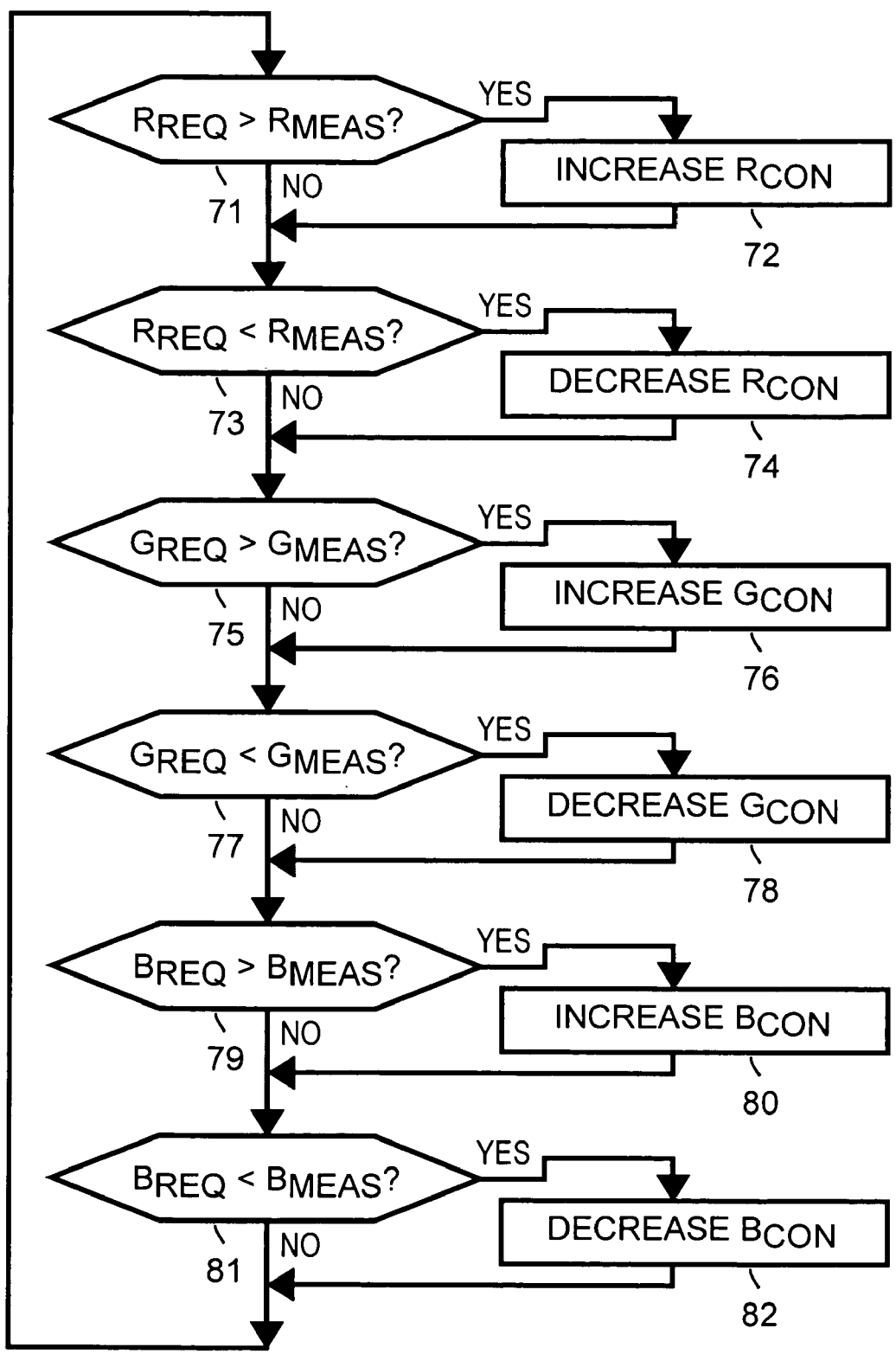
FIG. 3 illustrates operation of color control in accordance with an embodiment of the present invention.

FIG. 3 illustrates operation of control block 26. Color control block 26 can be implemented, for example, by hardware, firmware and/or software.

In a block 71, $R_{MEAS}$ value 21 (shown in FIG. 1) is compared with requested red value ($R_{REQ}$). If requested red value ($R_{REQ}$) is greater than $R_{MEAS}$ value 21, in a block 72, red control value ($R_{CON}$) is increased. For example, red control value ($R_{CON}$) is incremented.

In a block 73, $R_{MEAS}$ value 21 (shown in FIG. 1) is compared with requested red value ($R_{REQ}$). If requested red value ($R_{REQ}$) is less than $R_{MEAS}$ value 21, in a block 74, red control value ($R_{CON}$) is decreased. For example, red control value ($R_{CON}$) is decremented.

In a block 75, $G_{MEAS}$ value 22 (shown in FIG. 1) is compared with requested green value ($G_{REQ}$). If requested green value ($G_{REQ}$) is greater than $G_{MEAS}$ value 22, in a block 76, green control value ($G_{CON}$) is increased. For example, green control value ($G_{CON}$) is incremented.

In a block 77, $G_{MEAS}$ value 22 (shown in FIG. 1) is compared with requested green value ($G_{REQ}$). If requested green value ($G_{REQ}$) is less than $G_{MEAS}$ value 22, in a block 78, green control value ($G_{CON}$) is decreased. For example, green control value ($R_{CON}$) is decremented.

In a block 79, $B_{MEAS}$ value 23 (shown in FIG. 1) is compared with requested blue value ($B_{REQ}$). If requested blue value ($B_{REQ}$) is greater than $B_{MEAS}$ value 23, in a block

80, blue control value ($B_{CON}$) is increased. For example, blue control value ($B_{CON}$) is incremented.

In a block 81, $B_{MEAS}$ value 23 (shown in FIG. 1) is compared with requested blue value ($B_{REQ}$). If requested blue value ($B_{REQ}$) is less than $B_{MEAS}$ value 23, in a block 82, blue control value ($B_{CON}$) is decreased. For example, blue control value ($B_{CON}$) is decremented.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A lighting system comprising:
a mixing cavity that mixes light;
an optical cable attached to the mixing cavity, at least a portion of the optical cable being outside the mixing cavity;
a color sensor attached to the optical cable, the color sensor sampling light from within the mixing cavity via the optical cable, the color sensor being located outside the mixing cavity, the color sensor comprising:
a plurality of photo sensors each photo sensor from the plurality of photo sensors having an integrated color filter, the color sensor generating for each photo sensor an output signal with a voltage based on filtered light incident upon the photo sensor; and,
a color controller that controls light color within the mixing cavity, the color controller using information from the generated output signal for each photo sensor as feedback about light color within the mixing cavity.

2. A lighting system as in claim 1 wherein within the mixing cavity, light emitting diodes of a plurality of colors generate the light that is mixed.

3. A lighting system as in claim 1 wherein within the mixing cavity, light emitting diodes of a plurality of colors generate the light that is mixed, the plurality of colors including red, green and blue.

4. A lighting system as in claim 1 wherein the optical cable is a fiber optic cable.

5. A lighting system comprising:
a mixing cavity that mixes light;
an optical cable attached to the mixing cavity wherein the optical cable is attached to the mixing cavity by a substantially optically clear and transmissive epoxy;
a color sensor attached to the optical cable, the color sensor sampling light from within the mixing cavity via the optical cable; and,
a color controller that controls light color within the mixing cavity, the color controller using information from the color sensor as feedback about light color within the mixing cavity.

6. A lighting system as in claim 5 wherein when the optical cable is attached to the color sensor by the substantially optically clear and transmissive epoxy, a resulting joint is shielded by a substantially optically opaque epoxy.

7. A lighting system as in claim 5 wherein a color filter is located in one of the following locations:
between the optical cable and the color sensor;
within the mixing cavity so as to filter light received by the optical cable.

8. A lighting system comprising:
a mixing cavity that mixes light;
an optical cable attached to the mixing cavity, at least a portion of the optical cable being outside the mixing cavity;
a color sensor attached to the optical cable, the color sensor sampling light from within the mixing cavity via the optical cable, the color sensor being located outside the mixing cavity; and,
a color controller that controls light color within the mixing cavity, the color controller using information from the color sensor as feedback about light color within the mixing cavity;
wherein the optical cable is one of the following:
a light guide shielded from external ambient light,
a light guide not shielded from external ambient light,
a light panel shielded from external ambient light,
a light panel not shielded from external ambient light.

9. A lighting system comprising:
a mixing cavity that mixes light;
sensor means for sensing color of light, the sensor means comprising:
a plurality of photo sensors, each photo sensor from the plurality of photo sensors having an integrated color filter, the sensor means generating for each photo sensor an output signal with a voltage based on filtered light incident upon the photo sensor, the plurality of photo sensors being located outside the mixing cavity;
cable means, connected between the mixing cavity and the sensor means, for transporting light mixed by the mixing cavity for being sensed by the sensor means, at least a portion of the cable means being located outside the mixing cavity; and,
control means for controlling light color of light mixed by the mixing cavity, the control means using information from the generated output signal for each photo sensor as feedback about light color within the mixing cavity.

10. A lighting system as in claim 9 wherein within the mixing cavity, light emitting diodes of a plurality of colors generate the light that is mixed.

11. A lighting system as in claim 9 wherein within the mixing cavity, light emitting diodes of a plurality of colors generate the light that is mixed, the plurality of colors including red, green and blue.

12. A lighting system as in claim 9 wherein the cable means is a fiber optic cable.

13. A lighting system comprising:
mixing means for mixing light;
sensor means for sensing color of light;
cable means, connected between the mixing means and the sensor means, for transporting light mixed by the mixing means for being sensed by the sensor means wherein the cable means is attached to the mixing means by a substantially optically clear and transmissive epoxy; and,
control means for controlling light color of light mixed by the mixing means, the control means using information from the sensor means as feedback about light color within the mixing means.

14. A lighting system as in claim 13 wherein when the cable means is attached to the sensor means by the substantially optically clear and transmissive epoxy, a resulting joint is shielded by a substantially optically opaque epoxy.

15. A lighting system comprising:
mixing means for mixing light;
sensor means for sensing color of light, the sensor means comprising:

a plurality of photo sensors, each photo sensor from the plurality of photo sensors having an integrated color filter, the sensor means generating for each photo sensor an output signal with a voltage based on filtered light incident upon the photo sensor;

cable means, connected between the mixing means and the sensor means, for transporting light mixed by the mixing means for being sensed by the sensor means; and control means for controlling light color of light mixed by the mixing means, the control means using information from the generated output signal for each photo sensor as feedback about light color within the mixing cavity;

wherein a neutral density filter is located between the cable means and the sensor means.

16. A lighting system comprising:

mixing means for mixing light;

sensor means for sensing color of light, the sensor means comprising:

a plurality of photo sensors, each photo sensor from the plurality of photo sensors having an integrated color filter, the sensor means generating for each photo sensor an output signal with a voltage based on filtered light incident upon the photo sensor;

cable means, connected between the mixing means and the sensor means, for transporting light mixed by the mixing means for being sensed by the sensor means; and control means for controlling light color of light mixed by the mixing means, the control means using information from the generated output signal for each photo sensor as feedback about light color within the mixing cavity;

wherein a neutral density filter is situated within the mixing means so as to filter light received by the cable means.

17. A method comprising the following:

mixing light within a mixing cavity;

transporting light from the mixing cavity, through an optical cable, to a color sensor, the color sensor being located outside the mixing cavity and at least a portion of the optical cable being outside the mixing cavity;

sampling the transported light by the color sensor, the color sensor comprising a plurality of photo sensors, each photo sensor from the plurality of photo sensors having an integrated color filter, the color sensor generating for each photo sensor an output signal with a voltage based on filtered light incident upon the photo sensor; and, controlling light color within the mixing cavity based on information from the transported light sampled by the color sensor.

18. A method as in claim 17 additionally comprising the following step:

generating light within the mixing cavity by light emitting diodes of a plurality of colors.

19. A method as in claim 17 additionally comprising the following step:

generating light within the mixing cavity by light emitting diodes of a plurality of colors, wherein the plurality of colors include red, green and blue.

20. A method comprising the following:

mixing light within a mixing cavity;

transporting light from the mixing cavity, through an optical cable, to a color sensor;

sampling the transported light by the color sensor, the color sensor comprising a plurality of photo sensors, each photo sensor from the plurality of photo sensors having an integrated color filter, the color sensor generating for each photo sensor an output signal with a voltage based on filtered light incident upon the photo sensor; and, controlling light color within the mixing cavity based on information from the transported light sampled by the color sensor;

wherein transporting light from the mixing cavity, includes passing the light through a neutral density filter.

* * * * *